April 8, 1958     F. L. BARTELS ET AL     2,829,733
INTERSTITIAL BODY SUITABLE FOR USE AS A FILTER
Filed Aug. 18, 1953     2 Sheets-Sheet 1
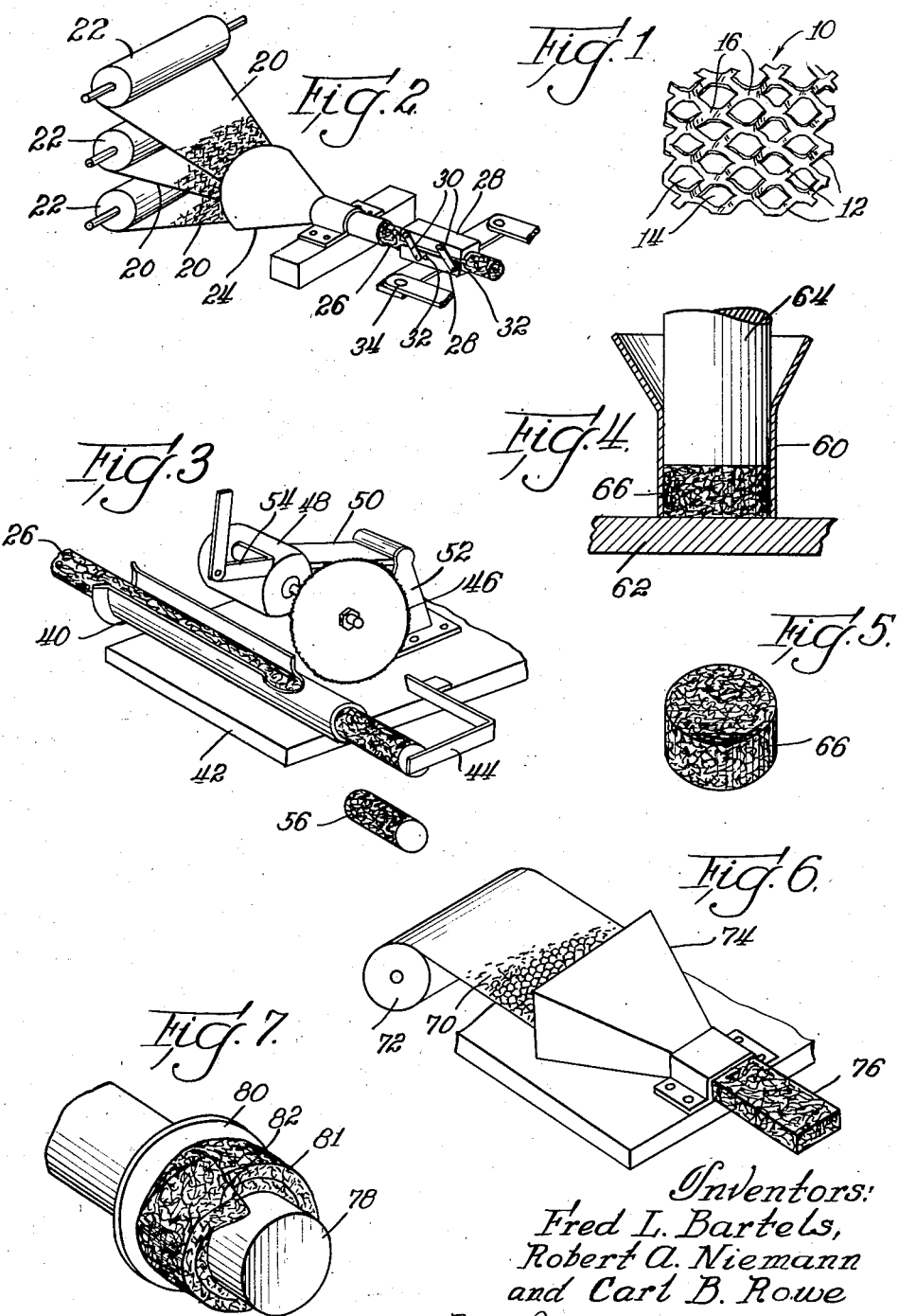

April 8, 1958 F. L. BARTELS ET AL 2,829,733
INTERSTITIAL BODY SUITABLE FOR USE AS A FILTER
Filed Aug. 18, 1953 2 Sheets-Sheet 2

Inventors:
Fred L. Bartels,
Robert A. Niemann
and Carl B. Rowe
By:— Jones, Jesch & Darb Attys.

2,829,733
Patented Apr. 8, 1958

United States Patent Office

2,829,733
INTERSTITIAL BODY SUITABLE FOR USE AS A FILTER

Fred L. Bartels, Robert A. Niemann, and Carl B. Rowe, Madison, Wis., assignors to Research Products Corporation, Madison, Wis., a corporation of Wisconsin Application August 18, 1953, Serial No. 374,971

9 Claims. (Cl. 183—51)

This invention relates to interstitial bodies made by compacting open-mesh sheet material composed of intersecting webs. In particular, it relates to interstitial bodies, especially adapted for use as a filter, made by compressing malleable, open-mesh sheet material composed of intersecting webs.

In the art of filtering, by which is meant to include the filtering of gases and liquids, the various individual applications require filters having different shapes and sizes and different degrees of porosity. A principal use of filters for gases is in the filtering of air, and where filtering of gases is referred to herein it is intended to embrace the filtering of air. Filters for gases are often of the impingement type, that is, the interstices are larger than the solid particles which it is desired to remove from the gas, and filtration is accomplished by coating the surfaces or baffles of the filter with an adhesive substance, against which the particles impinge in the travel of the gas through the filter. As a result of the impingement, the particles stick to the coated baffles and are held by the filter.

The invention is concerned with filters of the impingement type, but it is not limited thereto and it also relates to interstitial bodies adapted for use as filters of the strainer type in which the interstices are smaller than the particles to be removed, and removal is by the positive straining of the particles from the fluid stream because of their inability to pass through the interstices. Filters of the strainer type are used with both liquids and gases, and the invention embraces strainer type filters for such uses.

In the filtering art it is, therefore, necessary to be able to provide filters of different porosity, and for the many individual applications it is desirable to be able to make filters of different size and shape. It is a principal object of the invention to provide a filter construction in which the size, shape and porosity are readily and easily controlled within very wide limits.

Another object is to provide a filter of the character described which is highly effective in the filtering function.

Another object is to provide a filter of the character described which is simple and economical in construction.

The objects of the invention are not limited to the provision of filters, but embrace the provision of shaped bodies generally such as three-dimensional decorative and ornamental bodies or forms, flame barriers or arresters, or the like.

Briefly, the objects of the invention are accomplished by compacting or crushing a malleable, open-mesh sheet material composed of intersecting webs, the webs being joined together at their points of intersection, whereby as a result of the compacting operation, an interstitial body of the desired shape, size and porosity is formed.

Other objects and advantages will become apparent as the following description progresses in which several embodiments of the invention are described, which description is to be taken in conjunction with the accompanying drawings, in which Fig. 1 is a plan view of an open-mesh sheet suitable for making the interstitial body of the invention;

Figs. 2 and 3 are perspective views showing different stages of a method for making the compacted interstitial body from several sheets similar to that shown in Fig. 1;

Fig. 4 is a vertical, sectional view illustrating the final compacting operation upon the body;

Fig. 5 is a perspective view of the final compacted body;

Figs. 6, 7, 8 and 9 are views, corresponding to Figs. 2, 3, 4 and 5 respectively, illustrating a method for making a compacted body shaped differently from that shown in Fig. 5.

Figure 8:
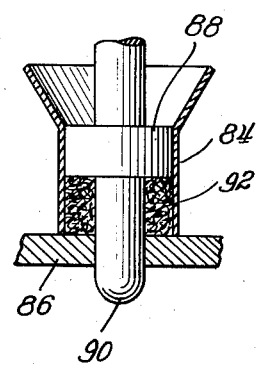

The material of which the interstitial body is made is a malleable, open-mesh sheet material. A form of sheet material which has been found to be well suited and which is preferred is the expanded sheet material 10 which is illustrated in Fig. 1 and which is composed of a substance which possesses a relatively high degree of malleability such as aluminum or copper. A mass of such sheet material has the property of being plastic under pressure, whereby it can be compacted or crushed to any desired size, shape and porosity, and will retain such size, shape and porosity when the compression is removed. In other words, such a mass can be molded by confining surfaces such as the surfaces of a die.

The expanded sheet material may be fabricated on an apparatus such as is described in Patent No. 2,611,298, and consists of an open-mesh network of webs 12 which enclose openings 14. The webs 12 intersect at the junctions 16 which have a width twice that of the webs 12. The webs are thin and flat in cross-section, and the flat planes of the individual webs are at an angle to the general plane of the sheet material. The slitted sheet 10 is formed by cutting transverse lines of slits in the sheet, said lines being spaced apart in the longitudinal direction of the sheet, and then stretching the sheet in the longitudinal direction to create the openings 14. In this process, the webs orient themselves in such manner that the planes thereof are not parallel with the general plane of the sheet, but rather the planes of both the webs 12 and the junctions 16 are at an angle to the plane of the sheet. In the specific pattern illustrated in Fig. 1, the webs 12 are curved so that the planes thereof vary throughout their length. Adjacent portions of the webs are differently oriented throughout the area of the sheet, this dissimilar orientation being repeated in a more or less regular pattern in each section of the sheet which surrounds one of the openings 14. Other expanded patterns have been used in which the webs are oriented more or less uniformly with the planes thereof at an angle to the plane of the sheet.

For the composition of the sheet material, the substances which are most suitable are those which are malleable, such as aluminum and copper and the metals which have malleability substantially equal to or greater than that of aluminum. For the purpose of the invention, the material should be thin, thicknesses up to .015 inch being suitable. Foil thicknesses from .001 inch to .005 inch are preferred.

While the pattern of expansion is not critical, for purposes of illustration expanded material is suitable in which the webs have a width of .020 inch to .085 inch, a width in the neighborhood of .040 inch being preferred for general purposes. Similarly, considering that the openings are substantially equivalent to square openings, a pattern in which the openings have a dimension of .05 inch to 1.0 inch between opposite sides is suitable, and a dimension of 0.20 inch to 0.40 inch is preferred for general applications. The expansion pattern is varied to adapt the final product to the use for which it is intended.

In accordance with the invention, the expanded sheet material 10 is gathered together somehow, that is, it is bunched together so that its character of a flat sheet of wide expanse is altered to that of a concentrated body. For this concentration of the material of the sheet, the term "gather" will be used herein in a sense similar to that in which the same term is used in the art of sewing. The gathering of the sheet material may be accomplished in any desired manner, one suitable method being by simply balling the material together by hand in the manner in which one makes a snowball, and another method being by passing the sheet material through a funnel. The concentrated mass is then subjected to suitable pressure, as between dies, and a product which is satisfactory for various uses is obtained which has a surprisingly uniform porosity throughout its volume.

A process for production of the interstitial body of the invention will be described. Several continuous sheets or strips 20 of the expanded sheet material 10, for example, expanded aluminum sheet having a thickness of .003 inch, is fed from the supply rolls 22 thereof into the large end or mouth of the funnel device 24 where the sheets are gathered together transversely and united or merged into the form of a solid cylinder 26 of interstitial material. To start the material through the funnel 24 the sheets 20 are first pushed through the funnel, but thereafter they are drawn through by a feeding mechanism which consists of the two gripping blocks 28 which are semi-cylindrical at their facing surfaces so as to conform to the shape of the cylindrical body 26. The blocks 28 are movably joined by toggle links 30, a pair of such toggle links being provided at each side of the blocks 28. The toggle links 30 are attached at their ends in freely pivotal manner to the respective blocks 28. At each side thereof, the lower block 28 has a pair of projecting lugs 32 so positioned that the toggle links 30 can freely pivot in a rearward direction (with respect to the direction of feed of the cylindrical body 26) upon said lower block, but are stopped from pivoting in a forward direction when they have reached a position in which they extend substantially perpendicularly to the upper and lower faces of said lower block. To the lower block 28 there is rigidly attached a motion-transmitting bar assembly 34, which is connected to suitable mechanism (not shown) for transmitting reciprocating motion thereto in a direction longitudinally of the cylindrical body 26.

As the lower block 28 is moved by bar assembly 34 in the forward direction, the upper block 28 under the influence of inertia and frictional engagement with the body 26 remains relatively stationary and the two blocks are drawn together by the toggle links 30 into sufficiently tight engagement with the body 26 as to frictionally grip said body and move said body forwardly with movement of lower block 28. After said body has been moved forwardly the desired distance, lower block 28 is moved rearwardly by bar assembly 34, and again under the influence of inertia and frictional engagement with the body 26 the upper block is held relatively stationary until the toggle links 30 extend substantially perpendicularly to the bottom and top faces of the blocks 28, when said links are held in the last-described position by the lugs 32. In this position, the blocks 28 are held apart sufficiently that their frictional engagement with the body 26 is insufficient to cause movement of said body 26. With rearward movement of bar 34, the said blocks 28 are moved rearwardly while the body 26 remains stationary, and after the said blocks have been moved rearwardly the desired distance, they again move forwardly and draw the body 26 forward with them. By this reciprocating motion, the body 26 is caused to undergo intermittent forward movements separated by intervals of rest.

In synchronism with the intermittent forward movements of the body 26, said body is severed transversely into sections of the desired length by the mechanism shown in Fig. 3. The feeding mechanism which has been described is located between the funnel device 24 and the severing mechanism shown in Fig. 3. Said severing mechanism consists of a tubular guide member 40 which is suitably mounted on supporting plate 42. Guide member 40 has the rearward portion thereof, that is, the portion into which the body 26 is initially fed, open for loading and inspection purposes. Also mounted upon supporting plate 42 is the stop member 44 which consists of a bar having the forward end thereof turned at an angle to the remainder and projecting across the path of the body 26, said stop member 44 being provided to insure that the body 26 will be advanced the desired distance in each advancing operation. The saw 46 is provided for severing the body 26 into the sections 56, said saw being driven by the motor 48 which is mounted upon the arm 50 which, in turn, is pivotally mounted upon the bracket 52 which is supported upon the supporting plate 42. The motor and saw are raised and lowered by the arm assembly 54 which is attached to the housing of motor 48 and which is raised and lowered by suitable mechanism (not shown) operated in synchronism with the advance of the body 26. The body 26 is severed into sections or slugs 56 by the saw 46 at each pause in the advance of body 26.

Each slug is compacted in the mechanism shown in Fig. 4. This consists of the female cylindrical die member 60 which rests upon base plate 62 and is flared outwardly at its upper end portion for convenience in feeding the slug 56 into it. The slug is placed in the die member 60 and a male die member 64 is lowered upon said slug under pressure and crushes, compresses or compacts said slug into the finished interstitial body 66. In a specific example of the process, the initial slug 56 is of a length approximately twice that of the final body 66, that is, the slug is compressed to approximately one-half of its initial volume and from an initial porosity of approximately 97.5 percent to a final porosity of approximately 95 percent. Such a body is quite suitable for use as an air filter for the intakes of internal combustion engines.

Figure 9:
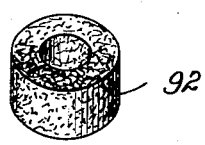

A method for making a body of different form will now be described. A single sheet of the expanded material 70 is fed from the supply roll 72 through the rectangularly-shaped funnel device 74 within which the sheet is gathered transversely and concentrated into the elongated strip or ribbon of interstitial material 76 which is of rectangular cross-section. The elongated strip 76 is severed into suitable lengths, and each length is wound spirally upon the mandrel 78 with the edge thereof against the collar 80 whereby the doughnut-shaped body 81 is formed. The end portion 82 of the strip is displaced laterally from the adjacent layer and the body 81 is removed from the mandrel 78. The end portion 82 is folded by hand so as to embrace the other layers, and the body 81 is then placed within the female die member 84 which rests upon base plate 86. A male die member 88 having a pilot portion 90 is then brought downwardly upon the doughnut-shaped body 81 and compresses said body into the finished product 92 which is shown separately in Fig. 9. An opening is provided in base plate 86 which is adapted to receive and guide pilot portion 90 of die member 88. Said pilot portion, in addition to serving as a guide for the die member 88, provides a die surface which assists in forming the central opening of the doughnut-shaped final product.

Figure 10:
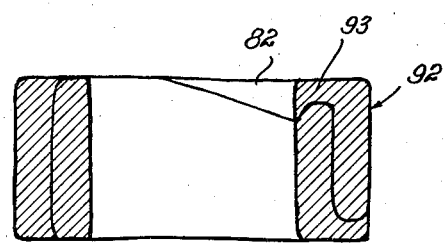
Fig. 10 is a diagrammatic view, on an enlarged scale, of the compacted body shown in Fig. 9.

The final product 92 is shown diagrammatically in Fig. 10, wherein the material of the outer layer is shown folded inwardly at 93 and embracing the material of the inner layers. Fig. 10 also illustrates the manner in which, under the influence of the pressure in the dies, the material of the inner layer turns or folds outwardly and fills the space left vacant by the lateral displacement of the outer layer.

The product shown in Fig. 10 is also suitable for use as an air filter for the intakes of internal combustion engines. The product of Fig. 5 is used where the retaining means for the filter encloses the cylindrical walls and the direction of air-flow through the filter is from one flat surface to the other. In the filter of Fig. 10 the upper and lower flat surfaces are covered and the direction of air-flow within the filter is from the exterior cylindrical surface to the interior cylindrical surface.

Figure 11:
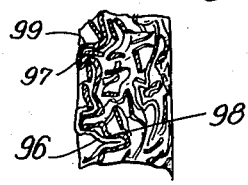
Fig. 11 is a fragmental, sectional view of the compacted body, showing in detail the manner in which the webs thereof are haphazardly arranged and interlocked with one another.

In the compressed products of Figs. 5 and 10, and as is true generally of the compressed products made in accordance with the invention, throughout the body of the mass thereof the orientation of the webs including the junctions thereof, is haphazard, such haphazard orientation or arrangement being illustrated in Fig. 11. In the crushing or compacting operation, the webs undergo a bending and also a displacement or movement. In many instances the web is turned substantially back upon itself at a 180 degree angle, and in this bending operation one bend becomes folded inside of another bend, as shown at 96 and 98 in Fig. 11, or a web becomes locked within a bend as shown at 97 and 99 of Fig. 11, or a web becomes pushed through an opening 14 to the opposite side of an adjacent web 12 or junction 16. In the same way, one junction 16 is pushed behind a different web or a different junction, whereas in the uncompressed condition it would normally lie on the forward side of said other web or junction. These instances of mutual engagement cause an interlocking of the webs and junctions. As a result of the action which has been described, throughout the body of the product the orientation and arrangement of the webs are haphazard, and the orientation of the expanded sheet is also haphazard or irregular, and the webs are mutually interlocked at heterogeneous or random portions thereof. The easy and permanent bending and interlocking of the webs are advantageous features of the invention in that they contribute to the plastic nature of the mass whereby it moves or flows under the compression to a condition of relatively uniform density or porosity, and the compressed body retains its size and shape upon removal of compression. No external binding elements are required to retain the body in the desired shape and size, and close control of the porosity of the body is accomplished. With an expanded sheet material composed of aluminum foil, there is an increase in size on the order of 5 percent and no perceptible change of shape upon release of compression.

A characteristic of the sheet which is important for the purposes of the invention is that the junctions 16 integrate the webs 12 and prevent relative movement at the intersections thereof, and under the compacting force the bending of the webs is confined to short sections thereof and they undergo relatively sharp and permanent bending and mutual engagement and interlocking as has been described. In contrast to this, a body in which the webs or strands are not joined at their intersections does not exhibit plasticity or dimensional retention. In such a body, the strands are relatively free to move with respect to each other under the forces of compression and are not bent as sharply or permanently and are not mutually interlocked as they are in the expanded sheet material product of this invention. In the product of the present invention, no special treatment of the expanded sheet material, such as roughening the surface or corrugating the sheet, is required in order to cause the interlocking of the webs as has been described, and, similarly, no particular arrangement of the material for the compressing operation is required. All that is necessary is that the material be concentrated as by the gathering, bunching or balling operations which have been described. A body having substantial interlocking and coherence is obtained by the funneling accomplished in funnel device 24 and without the compression accomplished in the dies 60 and 64. A body 56 of suitable dimensions is a product useful as an air filter. In such product, the gathered-together convolutions of the sheet are interlocked by an interlocking of the webs, and the sheet material is haphazardly arranged and oriented by the gathering operation.

Figure 12:
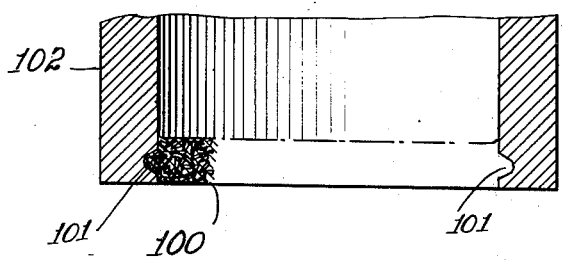
Fig. 12 is a sectional view of a filter of the strainer type made in accordance with the present invention.

As another advantage of the invention, the material can be compressed to a high degree. A body 100 is shown in Fig. 12, in which the expanded sheet material has been subjected to compression of the order of 1300 pounds per square inch, and the porosity thereof is approximately 50 percent. In making the product shown in Fig. 12, a mass of the expanded sheet material is compressed between cooperating surfaces while the edges thereof are in contact with the interior surface of the bottom end portion of the impervious hollow cylinder 102. Said surface has a continuous groove therein and under the influence of the pressure, the material of the mass flows into the groove to form the bead 101 which fixes the body 100 in position in the cylinder 102. The product illustrated in Fig. 12 is suitable for the filtration of liquid, and represents a filter of the strainer type, which has been described hereinbefore. Even with compression to such a small percentage of voids, the mass being compressed is sufficiently plastic that there is substantial dimensional retention upon release of the pressure.

In the product of the invention, the porosity of the final product is controlled entirely by the compression to which it is subjected, and there is no need for employing other expedients as the thickness of the strands or webs as a means for controlling the size of the pores or interstices. Another advantage of the present invention is that, with the strands or webs joined at their intersections, when the sheet material is severed there are no small sections of the webs cut loose from the body of the material. This can be readily appreciated from an observation of the sheet of Fig. 1. Severing said sheet along any line will not sever sections of the webs and render them loose. In a filter, and especially in a filter for the intakes of internal combustion engines, it is important that no small portions of the material be loose so that they can enter the cylinder of the engine. With a woven or knitted sheet material in which the strands are not joined at their intersections, small sections of the strands are severed and rendered loose whenever the sheet is cut.

Figure 13:
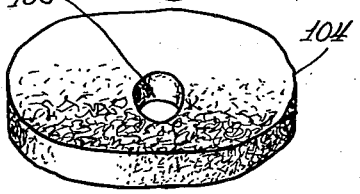
Fig. 13 is a perspective view of a different embodiment of the compacted, interstitial body of the invention.

As an illustration of the flexibility of the invention with respect to the form of the finished product, Fig. 13 shows a product 104 of irregular form. The initial slug for this product is made in the same manner as described in connection with the product illustrated in Fig. 9, that is, a doughnut-shaped slug is formed by the method described heretofore and illustrated in Figs. 6 and 7, and such slug is placed between a pair of cooperating dies similar to those shown in Fig. 8 but suitably shaped to provide the form of product shown in Fig. 13. The pilot portion of the male die forms the off-center opening 106 and the material is compressed between the dies, such material exhibiting sufficient plasticity or plastic flow that the final product exhibits a surprising uniformity of porosity throughout its volume.

As has been stated heretofore, the present invention is capable of producing interstitial bodies differing widely in porosity. Filters made in accordance with the invention may have a porosity of approximately 40 percent to 98.5 percent, and filters of the impingement type may have a porosity of approximately 85 percent to 98.5 percent.

While the use of open-mesh sheet material has been described in the foregoing, other malleable, open-mesh sheet materials may be used which are composed of intersecting thin webs which are joined together at their points of intersection. For example, open-mesh sheet material composed of knitted or woven strands or webs in which the webs are joined at their points of intersection may be used. Additional variations may be made by those skilled in the art. For example, interstitial products may be made having forms different from those which have been specifically described and illustrated.

Invention is claimed as follows:

1. A shaped, self-sustaining interstitial body comprising a plastic, malleable, crushed-together mass of expanded thin sheet material, said expanded sheet material comprising a multiplicity of short webs integrally interconnecting with adjoining webs, said webs being interlocked throughout the body of said mass, the orientation of said webs being haphazard.

2. A shaped, self-sustaining filter body comprising a plastic, malleable, crushed-together mass of expanded thin sheet material, said expanded sheet material comprising a multiplicity of short webs integrally interconnecting with adjoining webs, said webs being interlocked throughout the body of said mass, the orientation of said webs being haphazard, the porosity of said mass being approximately 40 percent to 98.5 percent.

3. A shaped, self-sustaining impingement type gas filter body comprising a malleable crushed-together mass of expanded thin sheet material, said expanded sheet material comprising a multiplicity of short webs integrally interconnecting with adjoining short webs, said webs being interlocked throughout the body of said mass, the orientation of said webs being haphazard, the porosity of said mass being approximately 85 percent to 98.5 percent.

4. A shaped, self-sustaining interstitial body comprising a plastic, malleable, crushed-together mass of expanded thin sheet material, said expanded sheet material comprising a multiplicity of short webs integrally interconnecting with adjoining webs, said mass being in the form of a spirally wound body crushed together under pressure in the direction of the axis of said spiral, said webs being interlocked at heterogeneous portions thereof throughout the body of said mass, the orientation of said webs being haphazard.

5. A shaped, self-sustaining interstitial body comprising a plastic, malleable, crushed-together mass of expanded thin sheet material, said expanded sheet material comprising a multiplicity of short webs integrally interconnecting with adjoining webs, said mass being in the form of a plurality of juxtaposed layers of said sheet material crushed together substantially in a direction parallel to a line lying in a broad surface of one of said layers, the webs of one of said layers interlocking with webs of adjacent layers and holding said layers together.

6. An interstitial body in accordance with claim 1 wherein the sheet material is not more than 0.015 inch thick.

7. An interstitial body in accordance with claim 6 wherein the thin sheet material is malleable sheet copper.

8. An interstitial body in accordance with claim 6 wherein the thin sheet material is malleable sheet aluminum.

9. An interstitial body in accordance with claim 1 wherein the sheet material is malleable metal foil having a thickness of between 0.001 inch and 0.005 inch.

References Cited in the file of this patent

UNITED STATES PATENTS

| | | |
|---|---|---|
| 1,490,544 | Stern | Apr. 15, 1924 |
| 1,499,985 | Kirsch | July 1, 1924 |
| 1,676,191 | Jordahl | July 3, 1928 |
| 1,774,232 | Hartwell | Aug. 26, 1930 |
| 2,070,073 | Walton | Feb. 9, 1937 |
| 2,327,184 | Goodloe | Aug. 17, 1943 |
| 2,334,263 | Hartwell | Nov. 16, 1943 |
| 2,382,560 | Goodloe | Aug. 14, 1945 |
| 2,558,185 | Leisen | June 26, 1951 |
| 2,683,500 | Goodloe | July 13, 1954 |